Figure 1:
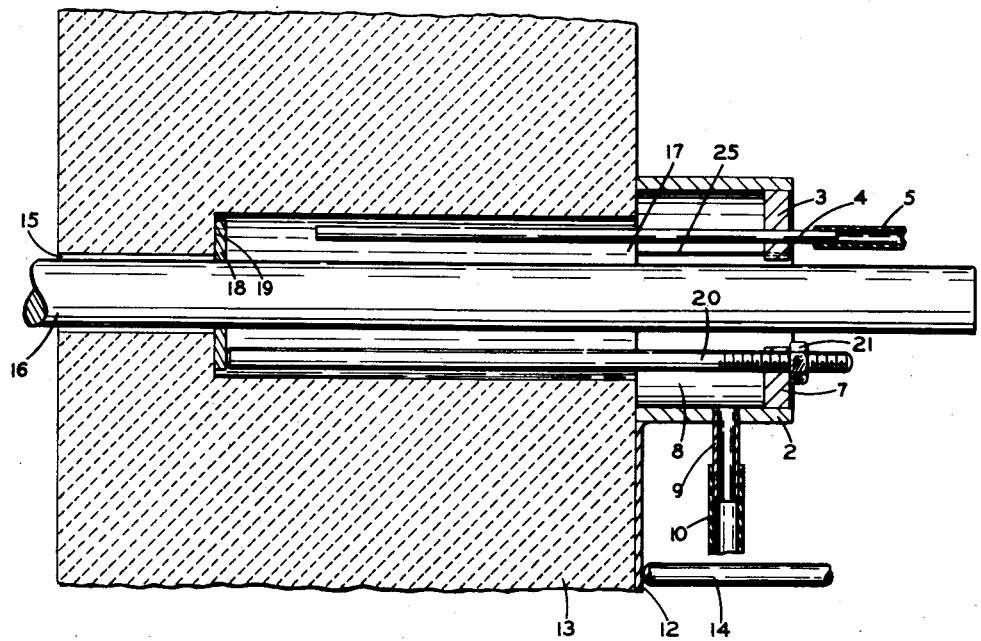

Aug. 6, 1957  W. P. BRAMLETT, JR., ET AL  2,802,041
ELECTRODE ASSEMBLY
Filed Dec. 14, 1955

INVENTORS
WILLIAM P. BRAMLETT, JR.
WILLIAM E. HOUCK

ATTORNEY

2,802,041
ELECTRODE ASSEMBLY

William P. Bramlett, Jr., and William E. Houck, Millville, N. J., assignors to Armstrong Cork Company, Lancaster, Pa., a corporation of Pennsylvania Application December 14, 1955, Serial No. 553,044

7 Claims. (Cl. 13—17)

This invention relates to an electrode assembly and more particularly to a fluid cooled electrode assembly for glass tanks.

One of the problems involved in electric heating of glass and the like is to avoid objectionable oxidation of that portion of the electrode which is exposed to the atmosphere, outside the inner wall of the tank or furnace. This can most conveniently be accomplished by applying a coolant such as water to the exposed surface of the electrode to reduce the temperature to a degree where oxidation will occur at an insignificant rate. A number of different electrode holders have been proposed to accomplish this. In most, the electrode has been disposed within a metal housing or tube and the coolant has been delivered into the tube and circulated in contact with the electrode.

When adjustment of the position of the electrode becomes necessary, it is customary to cut off the supply of coolant to the system, thus permitting the glass which normally congeals around the electrode and the electrode holder near its inner end to soften. The electrode is then jacked into its new position and the supply of coolant to the electrode and the electrode holder is re-established.

In a glass tank which may operate for many months in a single campaign, there is always the harzard of damage to or destruction of the electrode holder during the course of operation, due to repeated heating to glass melting temperatures during electrode adjustments.

It is an object of the present invention to provide an electrode assembly adapted for fluid cooling in which the essential elements of the electrode holder may all be mounted outboard with respect to the furnace wall.

With jacketed electrodes provided with means for introducing a water coolant between the jacket wall and the eelctrode, there is the problem which results from the deposit of salts from the cooling water. While in most cases temperature will be maintained below those at which excessive precipitation of the salts from the water will occur, accidental overheating or long continuous use of the equipment in a long campaign of the furnace may result in such objectionable deposit of the salts with no means being available for removing the same.

Another object of the invention is to provide an electrode assembly in which the refractory block serves as its own reception and discharge chamber for the cooling liquid and may be conveniently cleaned, should any salt deposit inadvertently occur on its wall surfaces.

A further object of the invention is to provide a fluid cooled electrode assembly including a replaceable seal which may be inserted into the assembly while the electrode is in position within the furnace.

A further object of the invention is to provide an electrode assembly for insertion into a refractory block constituting a portion of a glass tank or the like, the block being bored to provide a chamber to confine the fluid coolant applied to the electrode to cool the same and to direct the discharge of spent coolant.

Figure 2:
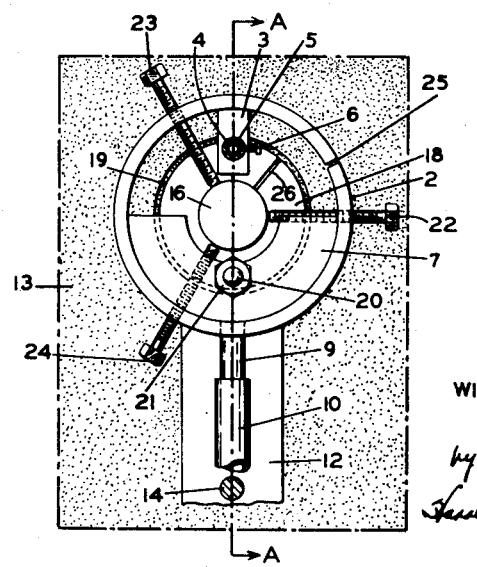

Other objects of the invention will be obvious from consideration of the following description of an embodiment of the invention in conjunction with the attached drawing, in which:

Figure 1 is a sectional view illustrating the invention, the section being taken along the line A—A of Figure 2 which is a front view of the electrode assembly.

As shown in the drawing, the device comprises a supporting collar 2 which may be of general cylindrical shape as shown or may be of other configuration. A supporting bracket 3 is provided on the collar 2 through which an inlet tube 4 passes. The tube 4 is connected to a source of coolant supply by a flexible insulating hose 5. A set screw or other fastening device 6 (Figure 2) may be provided and threaded into the bracket 3 for holding the tube 4 in adjusted position with respect to the bracket.

A semiannular bracket and dam 7 is also secured to the collar 2, as by welding, and is positioned in the lower half of the collar to provide a chamber 8 into which the coolant, such as water from the tube 4, may be discharged, through a discharge tube 9. A flexible hose 10 leads from discharge tube 9 to a suitable drain.

A holding clip 12 is secured to the lower portion of the collar 2 and may be pressed into contact with the furnace wall refractory or insulating block 13 by a conventional jack bolt 14. This serves to hold the electrode assembly in proper position with respect to the wall opening through which the electrode passes. The block 13 is preferably cast with an inner bore 15, the diameter of which may be slightly larger than the outer diameter of electrode 16 which passes therethrough. For example, the electrode may be about 1¼" in diameter and the bore 15 may be about 1½" in diameter. The block is provided with a counterbore 17 to receive the tube 4 and other elements associated with the electrode. With an 11" block wall, the counterbore may extend 8" from the outer surface of the wall and may be 3" in diameter.

A sealing member 18 is inserted into the counterbore 17 and abuts against the inner wall surface 19. It fits reasonably closely around the electrode 16, but has sufficient clearance to permit the electrode to be moved axially with respect thereto, as may be necessary from time to time as the electrode is consumed. A holding rod 20 is threaded into the bracket member 7 and holds the sealing member 18 firmly against the wall surface 19. A locking nut 21 may be provided to fix the rod 20 against displacement.

Holding bolts 22, 23, and 24 are threaded into the collar 2 and serve to hold the electrode 16 in its centralized position as shown in Figure 2, with the electrode extending into the furnace to the required depth. When adjustment of the position of the electrode is necessary, one or more of the bolts are loosened slightly to permit movement of the electrode.

Coolant is supplied to the electrode 16 and sealing member 18 has a spray or relatively small stream as required to maintain these parts below a desired maximum temperature. The coolant preferably is water, as mentioned previously. It is discharged directly onto the parts within the counterbore, and the spent water is discharged into chamber 8 and out through tube 9 and hose 10. The position of the inlet tube 4 may be adjusted to direct the stream or spray to the desired location, and the tube may then be fixed by tightening the screw 6.

The seal 18 serves to prevent the flow of molten glass or other material being heated into the counterbore 17. The coolant supplied to the seal serves to reduce the temperature in that area to a degree below the softening point of the glass; and as a result, the congealed glass serves also as a seal.

When it is desired to adjust the position of the electrode, the supply of coolant may be cut off for a period of time to permit the congealed glass around the electrode in the vicinity of the seal 18 to become softened sufficiently to permit the electrode to be moved. After adjustment of the position of the electrode, the supply of coolant will be directed against the electrode and the seal.

If the collar 2 and seal 18 are made of ferrous metal, such as iron, slots 25 and 26, respectively, should be provided to break the magnetic field and avoid heating of these parts. If the parts are made of nonmagnetic material such as brass, nonmagnetic stainless steel, or other nonmagnetic material, slotting will of course be unnecessary.

Should it become necessary to replace the seal 18, the supply of current to the electrode will be discontinued, the supply of cooling fluid will be shut off, and the jack bolt 14 and one or more of the electrode holding screws 22—24 will be loosened. The holder and its associated elements will be rotated slightly until the clip 12 clears the jack bolt 14. The unit may then be withdrawn axially; a new seal 18 will then be slipped over the electrode 16; and the holder replaced, the rod 20 serving to push the seal 18 along the electrode into final position. When the final position is approached, the rod 20 will be adjusted to firmly seat the new seal against that portion of the old seal which may remain within the bore 17. The electrode may then be reconnected to the source of current supply and the supply of coolant re-established.

The essential elements of the electrode holder are mounted outboard with respect to the furnace wall 13; the tube 4 is not subject to rapid deterioration, for it is out of contact with the electrode and does not attain an undersirably high temperature even during periods of electrode adjustment when the supply of coolant is discontinued. The seal 18 is readily replaceable; and, since the block 13 actually forms the cooling chamber and is, of course, not deleteriously affected by high temperatures, the electrode assembly will have a normal life greater than any normal tank campaign.

We claim:

1. In an electrode assembly disposed in a refractory wall member having an electrode-receiving bore therein and a counterbore extending therefrom to the exterior of said wall member, a supporting collar of magnetic material positioned outboard with respect to said wall member surrounding a portion at least of said counterbore therein, said collar having a slot provided therein extending throughout the full depth of said collar to avoid undesirable heating of said collar, an electrode extending through said collar and into and through said counterbore and said bore, means carried by said collar for securing said electrode in position with respect to said collar, means for holding said collar in position against said wall member, and means in said counterbore for delivering fluid coolant to said electrode with said counterbore serving as a chamber and conduit for the reception and discharge of fluid coolant delivered to said electrode.

2. In an electrode assembly disposed in a refractory wall member having an electrode-receiving bore therein and a counterbore extending therefrom to the exterior of said wall member, a supporting collar positioned outboard with respect to said wall member surrounding a portion at least of said counterbore therein, an electrode extending through said collar and into and through said counterbore and said bore, means carried by said collar for securing said electrode in position with respect to said collar, a sealing member fitted around said electrode and disposed within said counterbore surrounding the electrode-receiving bore therein to seal the opening between said bore and counterbore around said electrode, means for holding said collar in position against said wall member, and means in said counterbore for delivering fluid colant to said electrode with said counterbore serving as a chamber and conduit for the reception and discharge of fluid coolant delivered to said electrode.

3. In an electrode assembly disposed in a refractory wall member having an electrode-receiving bore therein and a counterbore extending therefrom to the exterior of said wall member, a supporting collar positioned outboard with respect to said wall member surrounding a portion at least of said counterbore therein, an electrode extending through said collar and into and through said counterbore and said bore, means carried by said collar for securing said electrode in position with respect to said collar, a sealing member fitted around said electrode and disposed within said counterbore surrounding the electrode-receiving bore therein to seal the opening between said bore and counterbore around said electrode, means carried by said collar and passing through said counterbore to hold said seal in sealing position, and means in said counterbore for delivering fluid coolant to said electrode with said counterbore serving as a chamber and conduit for the reception and discharge of fluid coolant delivered to said electrode.

4. In an electrode assembly disposed in a refractory wall member having an electrode-receiving bore therein and a counterbore extending therefrom to the exterior of said wall member, a supporting collar positioned outboard with respect to said wall member surrounding a portion at least of said counterbore therein, a dam provided on said collar defining with said collar and said refractory wall member a chamber for the reception of spent fluid coolant, said chamber being provided with an opening for the discharge of said spent fluid coolant, an electrode extending through said collar and into and through said counterbore and said bore, means carried by said collar for securing said electrode in position with respect to said collar, means for holding said collar in position against said wall member, and means in said counterbore for delivering fluid coolant to said electrode with said counterbore serving as a chamber and conduit for the reception and discharge of fluid coolant delivered to said electrode to said chamber for discharge therefrom.

5. In an electrode assembly disposed in a refractory wall member having an electrode-receiving bore therein and a counterbore extending therefrom to the exterior of said wall member, a supporting collar positioned outboard with respect to said wall member surrounding a portion at least of said counterbore therein, an electrode extending through said collar and into and through said counterbore and said bore, means carried by said collar for securing said electrode in position with respect to said collar, a sealing member fitted around said electrode and disposed within said counterbore surrounding the electrode-receiving bore therein to seal the opening between said bore and counterbore around said electrode, means carried by said collar and passing through said counterbore and engaging said seal to hold said seal in sealing position, means for adjusting the position of said holding means, a jack bolt for holding said collar in position against said wall member, a tube disposed in said counterbore for delivering fluid coolant to said electrode with said counterbore serving as a chamber and conduit for the reception and discharge of fluid coolant delivered to said electrode, means carried by said collar for supporting said tube, means carried by said supporting means for holding said tube in adjusted position within said counterbore, and a dam provided on said collar defining with said collar and said refractory wall member a chamber for the reception of spent fluid coolant, said chamber being provided with an opening for the discharge of spent fluid coolant.

6. In an electrode assembly, the combination of claim 2 in which said seal is formed of magnetic material and in which a slot is provided extending throughout the full extent of said seal from the inner periphery to the outer periphery thereof to avoid undesirable heating of said seal.

7. In an electrode assembly disposed in a refractory wall member having an electrode-receiving bore therein extending to the interior of said wall member and a counterbore therein extending therefrom to the exterior of said wall member, an electrode extending into and through said counterbore and said bore in said wall member, means for delivering fluid coolant to said electrode with said counterbore serving as a chamber and conduit for the reception and discharge of fluid coolant delivered to said electrode, a demountable holder for supporting said electrode, said holder being positioned outboard with respect to said wall member and being disposed in abutting relationship with the exterior of said wall member surrounding a portion at least of said counterbore therein to provide a receptacle for fluid coolant discharged from said counterbore, means carried by said holder for adjustably securing said electrode in position with respect to said holder, and means for demountably securing said holder in position against the exterior of said wall member.

References Cited in the file of this patent

UNITED STATES PATENTS

| | | |
|---|---|---|
| 2,159,361 | Atkinson et al. | May 23, 1939 |
| 2,693,498 | Penberthy | Nov. 2, 1954 |
| 2,697,125 | Douglas | Dec. 14, 1954 |
| 2,736,759 | Penberthy | Feb. 28, 1956 |